United States Patent [19]

Corwin et al.

[11] Patent Number: 4,498,770

[45] Date of Patent: * Feb. 12, 1985

[54] APPARATUS AND METHOD FOR DETERMINING THE CONFIGURATION OF A REFLECTIVE SURFACE

[75] Inventors: Richard R. Corwin, Xenia; Stephen L. Moorman, Miamisburg, both of Ohio

[73] Assignee: Beta Industries, Inc., Dayton, Ohio

[*] Notice: The portion of the term of this patent subsequent to Feb. 23, 1999 has been disclaimed.

[21] Appl. No.: 350,339

[22] Filed: Feb. 19, 1982

Related U.S. Application Data

[63] Continuation-in-part of Ser. No. 43,442, May 29, 1979, Pat. No. 4,316,670.

[51] Int. Cl.³ .............................................. G01B 9/02
[52] U.S. Cl. ..................................... 356/349; 356/359
[58] Field of Search ............... 356/349, 359, 360, 371; 73/653, 655, 656, 657

[56] References Cited

U.S. PATENT DOCUMENTS 4,030,830  6/1977  Holly .................................. 356/359
4,263,002  4/1981  Sathyakumar ....................... 356/349

OTHER PUBLICATIONS

Ueha et al. "Optical Heterodyne Measurement of In-- Plane Vibrations" *Japan J. Appl. Phys.*, vol. 14, Suppl. 14-1, pp. 335-338, 1975.

Mottier, "Microprocessor-Based Automatic Heterodyne Interferometer", *Proc. SPIE*, vol. 153, pp. 133-138, 1978.

*Primary Examiner*—Davis L. Willis
*Assistant Examiner*—Matthew W. Koren
*Attorney, Agent, or Firm*—Jacox & Meckstroth

[57] ABSTRACT

Disclosed is a system for the precision, high speed, non-contacting measurement of the shapes of reflective surfaces. This system consists of multiple laser fringe pattern transmitters, a random access image dissector camera or receiver, and a computer analysis system. Three laser transmitters project three fringe patterns onto a specimen surface such that the coordinates of the surface of the specimen can be obtained with an image dissector camera, imaged on the specimen, by separate measurement of the reflection by the surface from each transmitter. The computer analysis system decides which picture elements (pixels) are of interest, directs the receiver to "look at" those pixels, directs a digitizer to interrogate alternately the input numbers that are proportional to the coordinates of the specimen point. In a similar manner the shape of the entire specimen surface can be characterized and stored in computer memory, or the amplitude and frequency of vibration of a point on a vibrating reflective surface may be determined and displayed or stored.

24 Claims, 10 Drawing Figures

APPARATUS AND METHOD FOR DETERMINING THE CONFIGURATION OF A REFLECTIVE SURFACE

RELATED APPLICATION

This application is a continuation-in-part of application Ser. No. 043,442, filed May 29, 1979, U.S. Pat. No. 4,316,670.

BACKGROUND OF THE INVENTION

Previously, surface contours of manufactured parts or specimens have been measured using surface contacting methods such as a scanning stylus. Holographic methods which must be interpreted by a human observer have been described in the literature (see e.g. Optical Holography by R. J. Collier, C. B. Burckhardt, and L. H. Lin, Academic Press, 1971). These methods require either mechanical contacting or slow photographic chemical processing.

Recently issued U.S. Pat. No. 4,030,830 discloses a process and apparatus for sensing defects on a smooth surface. Although this patent uses similar components, a small region of fringes are formed where the fringes must be scanned over the surface to measure large surfaces. The system does not accurately characterize the surface in all three dimensional coordinates, nor does it utilize a computer controlled scanning system.

SUMMARY OF THE INVENTION

The present invention differs in many respects from prior art systems, including the total system concept, the laser or optical transmitter embodiment, the computer controlled image dissector receiver, and the use of three transmitters to allow accurate determination of all three coordinates of a specimen point. The transmitters are based on creating two closely-spaced point sources each of which are of a slightly different optical frequency. Irradiating outwardly from the point sources are two expanding, spherical waves which overlap to form a large region of optical fringes extending over the entire region of the specimen. The fringe region is a set of parallel planes which move in a direction perpendicular to themselves and also perpendicular to the laser propagation.

Contour measurement is a coordinate measurement in the direction of the fringe propagation and is accomplished by measuring the phase or timing of fringe movement. The measurement does not depend on whether the surface lies either within or just outside the fringe region as in the previously mentioned patent. In one embodiment, the entire surface must lie within the relatively larger fringe region in order to accomplish the measurement.

The system of the present invention also utilizes electronic phases which are measured and stored in a computer. This allows the three coordinates of a given specimen point to be measured relative to all other points over the surface of the specimen. Thus surfaces of any shape can be measured including planes, spheres, cones, cylinders, or complex shapes such as gears or turbine engine blades. For example, a complex shaped part containing two concentric cylindrical surfaces can be inspected for concentricity. These types of measurements can be accomplished by the special embodiments described in more detail in the following paragraphs.

DESCRIPTION OF THE PREFERRED EMBODIMENTS

Figure 1:
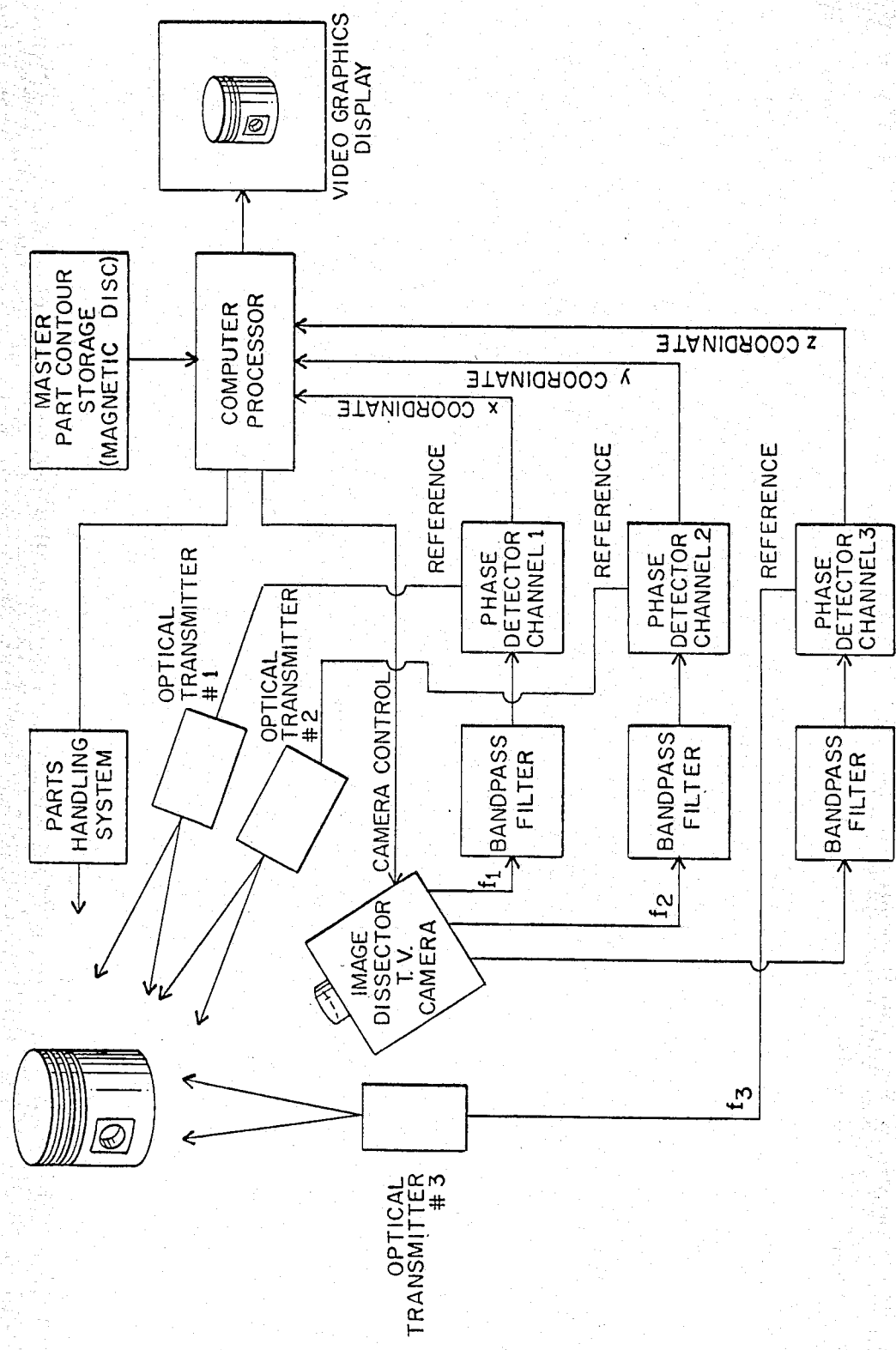
FIG. 1 is a block diagram of a contour measurement system constructed in accordance with the invention and using a frequency multiplexing technique.

FIG. 1 shows a block diagram of a system for measuring the surface contour of specimens. Three transmitters are used each of which generates a moving optical fringe pattern along a given direction. These fringes are similar to parallel planes which are parallel to the laser propagation path but move along a direction perpendicular to the planes. The optical transmitter concept consists of any implementation whereby two waves each propagating from separate coherent point sources and each of slightly different optical frequency propagate into and overlap in a region where the surface contour is to be measured.

The point source separation creates the fringes (phase difference), and the optical frequency difference between the two point sources creates the fringe movement (electronic carrier frequency). The contour measurement is along the fringe movement direction, and, as a result, three transmitters are required to measure accurately the three dimensional location of a specimen point in space. The transmitters are oriented so that the fringes move along three directions which are noncoplanar. In many cases they may be oriented along three mutually perpendicular directions which form a basis vector set for locating specimen surface points directly in a rectangular coordinate system.

In some cases because of the specimen shape or size, it may be necessary to orient the fringes along three directions which are not mutually perpendicular. Under these conditions, data (or surface point locations) transmitted into the computer will be in coordinates of a nonrectangular coordinate system, and depending upon other factors such as shape or the inspection application this data can be analyzed directly or transformed into an appropriate rectangular coordinate system by the computer before analysis.

Another embodiment of this system is to irradiate the image dissector image plane with two optical transmitters with their respective fringe patterns oriented perpendicular to each other. This allows the two coordinates of the scan point in the image plane of the dissector to be measured by the phases of the moving fringes. This is equivalent to measuring two of the coordinates of the specimen. The third coordinate is measured using a single transmitter irradiating the specimen directly with the fringe movement direction oriented along a line which is noncoplanar with the other two fringe movement directions.

Regardless of the coordinate system, defined by the location and orientation of the three transmitters, the coordinates of the specimen are measured by a computer controlled (image dissector) television camera. The computer commands the image dissector to observe a point on the specimen and to record the electronic phases of the three moving fringe patterns. This measurement of the three coordinates can be accomplished by either frequency multiplexing or time multiplexing. In the frequency multiplexing technique, the three transmitters are each driven at different fringe frequencies. Without moving the dissector observation point, the three coordinates are measured simultaneously using three bandpass filters to separate the frequencies and three phase meters to detect the respective phases. The phases are directly proportional to the coordinates of the specimen point. After the three coordinates are stored the computer directs the dissector to observe a new point, and the measurement process is repeated.

In the time multiplexing method all transmitters can be driven at the same frequency, but each transmitter is turned on then off in succession. The three phases (coordinates) are successively measured and stored in the computer using one bandpass filter and phase meter.

Preselected scans of the image dissector can be programmed into the computer to optimally evaluate or inspect the specimen or manufactured part. After the coordinates of all the points on the preselected scan have been stored, the data can be fitted to the equation for the master shape. Deviations from the master can be displayed as defective regions of the specimen on a graphics terminal display. Using specific slices of the data, profiles of the surface can be inspected and parts either accepted or rejected by a computer controlled parts handling system.

Examples of master shapes include equations of cylinderical surfaces, conical surfaces, plane surface, spherical surfaces or combinations of these. Data stored in the computer will be analyzed with arbitrary position and orientation in space. Therefore, variations in rigid body translation or rotation of successive parts will not effect the results. Large parts or parts which require inspection around its entire surface will be rotated and scanned in several overlapping sections. This can be accomplished by rotating these parts through fixed angular increments between image dissector scan frames using a computer controlled parts handling system as illustrated in FIG. 1.

Figure 2:
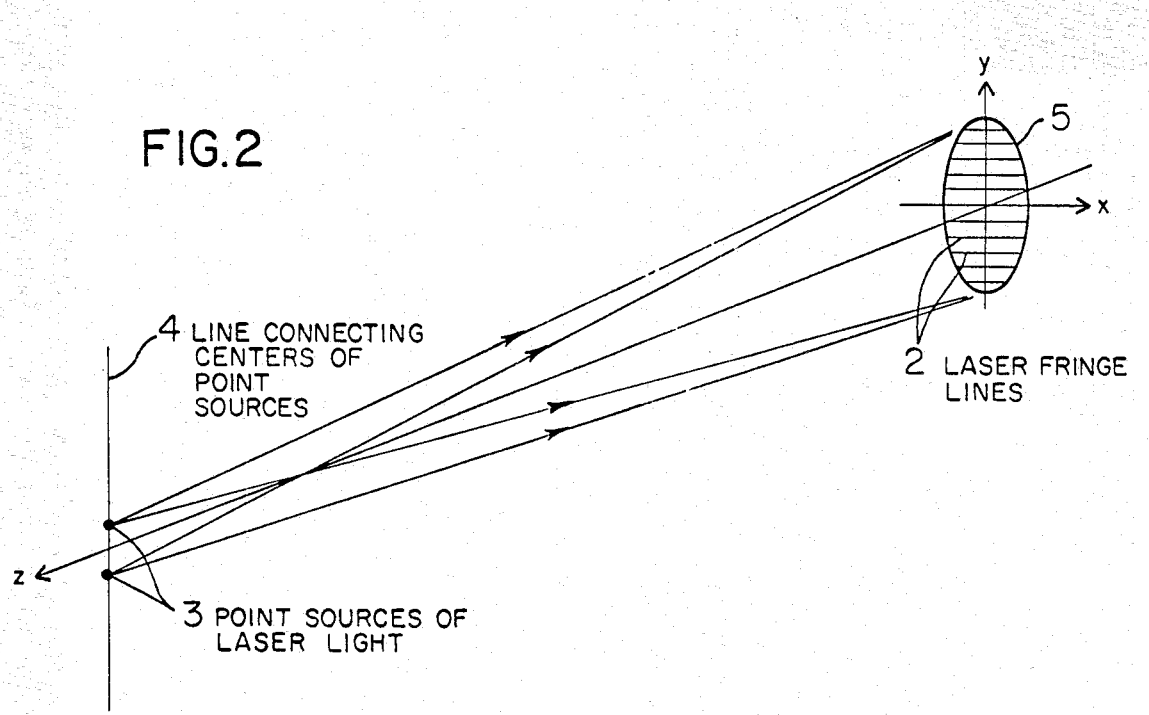
FIG. 2 shows the general concept of creating a moving laser fringe pattern from two point sources.

Referring to FIG. 2, the general approach to creating a moving fringe pattern 2 is to create two point sources of laser light 3 each of which are at slightly different optical frequencies. The two point sources are created from two laser beams and allowed to expand and overlap onto a target 5 such as, for example, a manufactured part. Assuming that the target 5 is a flat plane lying in the xy plane and that the two point sources 3 lie on line 4 which is parallel to the y axis, then the fringe lines 2 are parallel to the x axis and move in a direction along the y axis. Using an appropriate optical receiver, the y coordinates of the target surface can be determined by measuring the relative phases of the fringes as they move across the surface points. When the source separation is small compared to their distance from the target, then the fringe separation does not vary significantly as the target (xy plane) is moved forward or backward along the z-axis. This allows a single coordinate to be accurately measured in one direction independently of the other two orthogonal directions.

The fringe spacing, $\Delta y$, is given by the formula $$\Delta y = \frac{s}{d} \lambda \tag{1}$$

where d is the distance between point sources, s is the source point to target distance, and $\Delta$ is the laser wavelength. The corresponding equation for the phase, $\Omega$, of the moving fringes is:

$$\Omega = \frac{2\pi}{\lambda} \frac{d}{s} y \tag{2}$$

where y is the y coordinate shown in FIG. 2.

All of the transmitter configurations are fabricated of commercially available off-the-shelf optical components. In general, any laser can be used to generate moving optical fringes as previously described. For example, Hughes Model 3235H-PC Helium-Neon gas lasers have been successfully used as transmitters.

Beamsplitters, lenses, and mirrors are used to split the laser beam into two beams, (or recombine two beams into one), focus the beam to a point, or reflect it along a different direction. These are commercially available from several sources, such as from Broomer Laboratories or from Melles Griot, or from Oriel Corporation.

A spatial filter consists of an opaque surface with one or more very small pinholes located at specified points so as to pass only the laser beam which is focused onto the pinhole. These pinhole filters are mounted on a micrometer mechanism so that the pinhole can be easily and precisely maneuvered to the focused laser point. Spatial filters are commercially available or can be easily manufactured by punching small holes through thin metal shim stock.

A beam expander consists of a microscope objective lens and a spatial filter, both mounted on a translating mechanism. The objective lens focuses the laser beam down to the pinhole filter. After the beam propagates beyond the focused point, it expands into a spherical wave. The spatial filter blocks unwanted waves and provides for a clean, expanding spherical wavefront. Beam expanders are commercially available from Newport Research Corporation.

Acousto-optic modulators are solid state devices which use sonic waves impressed on an optical material, such as high quality flint glass, to modulate a laser beam. Refraction and diffraction of the laser light passing through the transparent material will occur when a sound wave is impressed upon the material at right angles. The result is that, depending on the alignment of the laser and the power of the impressed sonic wave, several output laser beams can be created whose optical frequencies have been shifted by an amount equal to n times the impressed sonic frequency, where n is the order number of the diffracted beam and can be zero or any positive or negative integer. For this invention (depending upon the configuration), it is desirable to obtain either one or two output beams and suppress the others. Another important characteristic of these devices is that the angle between the output diffracted beams is well defined and constant. A more detailed theory and description of acousto-optic modulators is given in the Handbook of Optics, McGraw-Hill, 1978, pages 17-15 through 17-20. A system which has been successfully used is the Model ADM-40 Acousto-optic Modulators manufactured by IntraAction Corporation, Bensenville, Ill.

Figure 3:
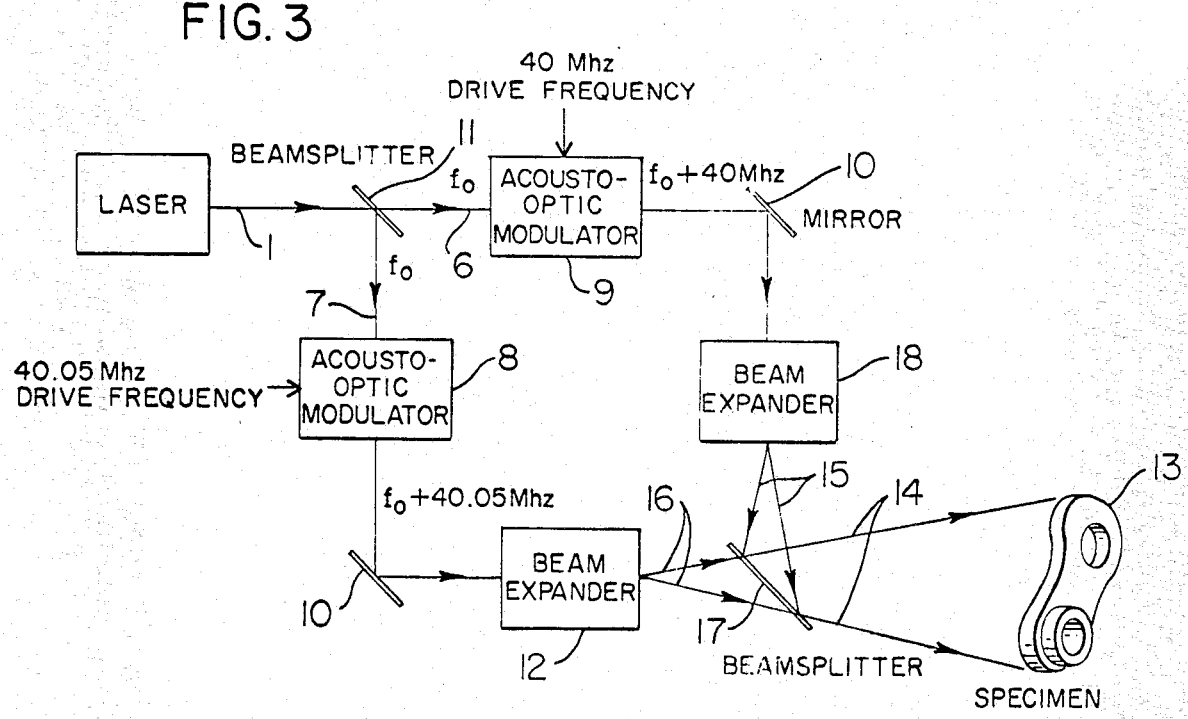
FIG. 3 shows a ring transmitter using one acousto-optic modulator in each path.

Referring to FIG. 3, the raw laser beam 1 is split into two beams 6 and 7 with a beamsplitter 11. Then each beam is passed through an acousto-optic modulator 8 and 9 and a beam expander 12 and 18 before being recombined on another beamsplitter 17. The combined beam 14 is directed onto the specimen 13, and the angle between the beams 15 and 16 is set by properly positioning the beamsplitter 17. The frequency shift can be obtained by driving one modulator at a slightly higher frequency than the other.

The beam splitter 17 creates two closely-spaced point sources. One point source is fixed within the beam expander 12 which propagates the wave through the beamsplitter. The other is a virtual point source that is located (because of reflection off the beamsplitter 17) at a point very close to the first point source.

Another embodiment of the ring transmitter is to use only one modulator in one path of FIG. 3. The optical frequency shift would be the driving frequency of the modulator or an integer multiple of the driving frequency.

Still another ring transmitter embodiment is to use two modulators cascaded in only one of the paths. In this case, the output beam of the cascaded modulators would be frequency shifted with respect to the input beam resulting in a net difference frequency between the two optical paths. The optical frequency shifts that can be obtained, include either modulator driving frequency, the sum of the two driving frequencies, difference between the two frequencies, or an integer multiple of any of these optical frequency shifts.

In all three of these ring transmitters, the output beamsplitter 17 defines or creates the point source separation, which defines the fringes. The acousto-optic modulators are used only to create the optical frequency shift that defines the fringe frequency on the target 13 (specimen). Also in each configuration, only one of the diffracted beams from each modulator is used, and the other beams are suppressed. In the following transmitter configurations, two output diffracted beams are used.

Figure 4:
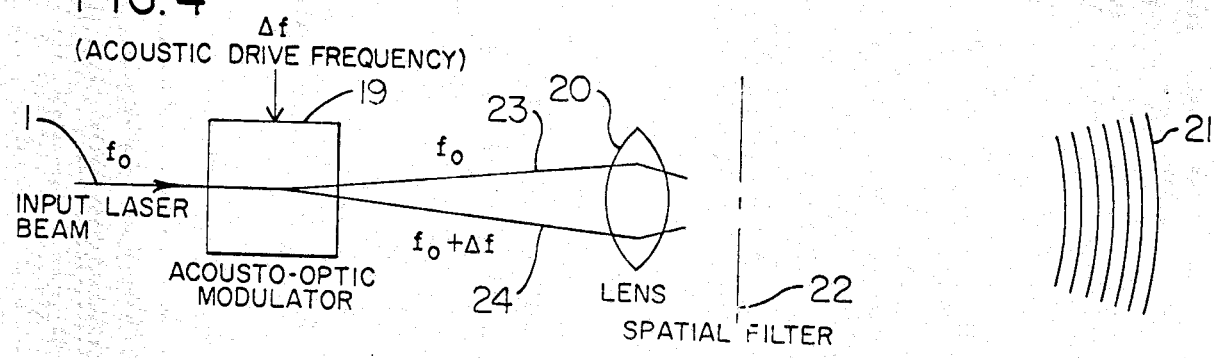
FIG. 4 shows an in-line transmitter using one acousto-optic modulator.

Referring to FIG. 4, the raw beam 1 from the laser is passed directly through an acousto-optic modulator 19 where it is diffracted through fixed angles and also frequency shifted both upwardly and downwardly by an amount equal to the drive frequency. Since the angle between any two beams is small (less than 1 degree), any two of the beams can be passed through a suitable lens 20 and expanded to provide two overlapping spherical waves 21 of different optical frequencies each originating from two closely spaced sources as shown in FIG. 4. This provides the same type of overlapping waves as the ring transmitters do, but in a much simpler hardware configuration.

As shown in FIG. 4, a spatial filter 22 is placed in the focal plane of the lens 20. The two diffracted beams 23 and 24 (of optical frequencies $f_o$ and $f_o + \Delta f$) are each focused down to two separate point sources in the focal plane of the lens 20. The spatial filter 22 consists of an opaque surface made from thin shim stock containing two small pinholes whose diameters and separation are chosen to provide for two clean, spatially coherent spherical waves.

Figure 5:
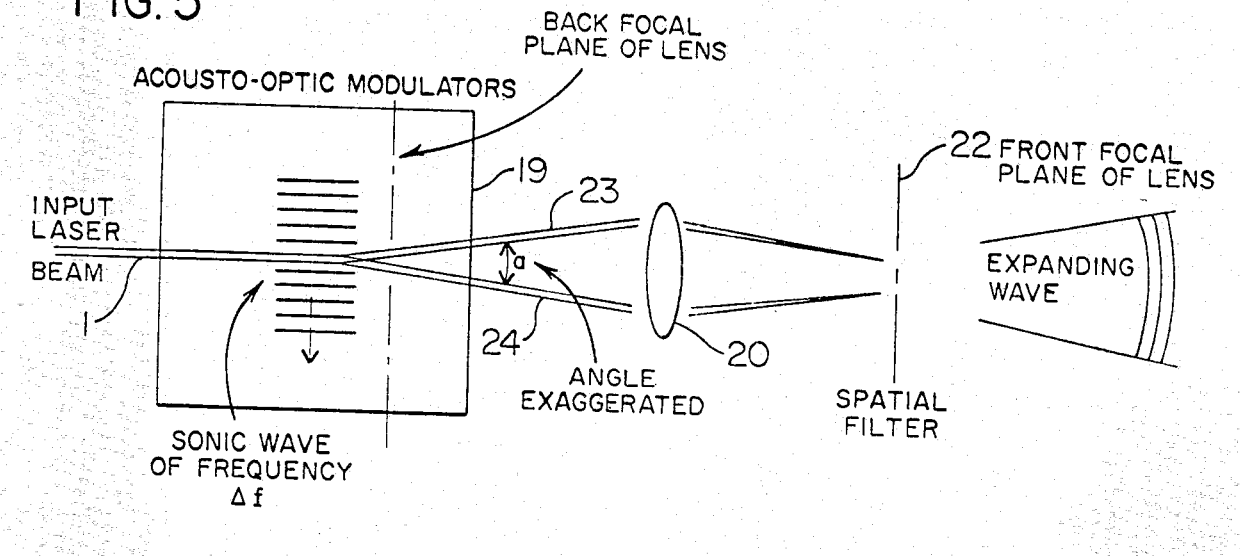
FIG. 5 shows the position of the lens focal plane with respect to the diverging point where the acousto-optic modulator diffracts the input laser beam into two beams.

The focal length of the lens 20 determines the diameter of the fringe pattern, the point source separation and, therefore, the fringe separation. The lens should be placed in front of the acousto-optical modulator 19 so that its focal plane is just in front of the point where the input laser beam 1 is diffracted into two beams 23 and 24. This point occurs inside the acousto-optic modulator 19, as shown in FIG. 5. The focal length can be changed to obtain a larger or smaller fringe separation and target fringe pattern as the application requires. The point source separation in the front focal plane of lens 20 is given by the formula:

$$\text{Point Source Separation} = d = \alpha f \qquad (3)$$

where f is the lens focal length, and $\alpha$ is the angle between the two diverging beams exiting from the acousto-optic modulator 19. Typically the point source separation can be any amount from a few millinches up to as much as 0.1 inches depending upon the application. The pinhole diameters are much smaller than the pinhole separation and depend upon the laser wavelength and the lens focal length.

The frequency difference between the two waves (fringe frequency) is the sonic wave frequency, $\Delta f$, if two adjacent diffracted orders are selected from the modulator output. In most cases, the zeroth order output beam and either the positive first order or negative first order beam will be selected. For the Model ADM-40 modulator referred to earlier, the input sonic frequency is $\Delta f = 40$ Megahertz. If two nonadjacent diffracted orders are used, then the frequency difference (fringe frequency) will be the difference between order numbers multiplied by $\Delta f$ (40 Megahertz).

Another embodiment of an in-line transmitter is to pass a laser beam directly through two cascaded acousto-optical modulators whose sonic fields are oriented transverse to the laser beam. (The sonic fields can be either in opposing or in the same directions). The result is that any diffracted beam from the first modulator will be diffracted through many orders by the second modulator. If the modulators are driven at different frequencies $\Delta f_1$ and $\Delta f_2$ then a particular diffracted beam at the cascaded output will have frequency, f, and angle, $\alpha$ given by the formula $$f = f_o + n_1 \Delta f_1 + n_2 \Delta f_2 \qquad (4)$$

$$\alpha = n_1 \alpha_1 + n_2 \alpha_2 \qquad (5)$$

where $n_1, n_2 = 0, \pm 1, \pm 2, \pm 3, \ldots$ are the order numbers of the first and second modulators respectively, $\alpha_1$ and $\alpha_2$ are the diffraction angles between successive orders of the first and second modulators, respectively, and $f_o$ is the input laser frequency. Positive orders are diffracted (deflected) in the same direction as the sonic propagation. Also, from the properties of acousto-optical modulators $$\alpha_1 \propto \Delta f_1 \quad (6)$$

$$\alpha_2 \propto \Delta f_2 \quad (7)$$

By proper adjustment of the modulators, two output beams can be selected and transmitted through a lens and two pinholes similar to the setup described previously. This configuration consists of inserting the two cascaded modulators in place of the one modulator shown in FIG. 4. One advantage to this configuration is that many more frequency differences and angles (between the two output beams) are available for a wider range of applications.

Figure 6:
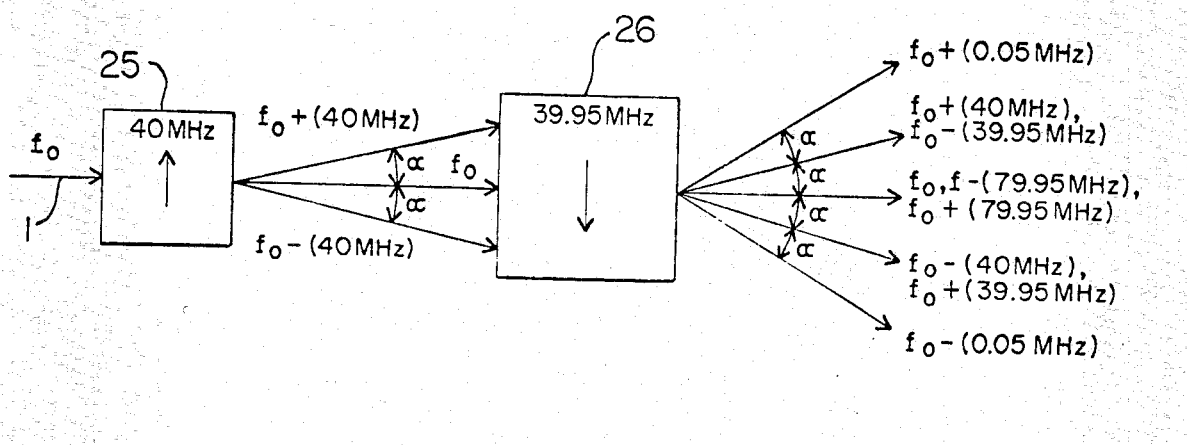
FIG. 6 shows diffracted beams with corresponding diffraction angles and frequency shifts for two cascaded acousto-optic modulators with sonic fields propagating in opposing directions and transverse to the input laser beam.

An example of a cascaded configuration with opposing sonic fields is shown in FIG. 6, which illustrates the results for only the zero, +1, and −1 diffracted orders of each modulator. Two of the beams shown in FIG. 6 are discussed in more detail. The input beam 1 is zero order diffracted through both modulators 25 and 26 at zero angle and zero frequency shift. The input beam 1 is also diffracted downward through an angle of $\alpha$ and a decreasing frequency shift of 40 MHz by the first modulator 25, and it is further diffracted downward through an additional angle $\alpha$ and an increasing frequency shift of 39.95 MHz by the second modulator 26. This results in a total angular shift of $2\alpha$ and a net frequency shift of 50 MHz with respect to the undeviated beam. Here the angle $\alpha$ between adjacent orders is assumed to be the same for both modulators (see equations 6 and 7) since their drive (sonic) frequencies are nearly the same. For the Model ADM-40 modulators, the angle $2\alpha$ is 13.16 milliradians for drive frequencies of 40 Megahertz. These two output beams can be passed through an appropriate lens and expanded to provide two overlapping spherical waves of different optical frequencies (50 KHz difference) each originating from two closely spaced sources in a setup similar to that shown in FIG. 4.

One problem with this technique is that for driving frequencies which are nearly the same, several resulting output beams are diffracted into angles which are nearly the same. This can be shown from above Equations 4, 5, 6 and 7. Practical pinhole filters located in the focal plane of the lens can not filter out all of the unwanted, frequency-shifted beams.

Figure 7:
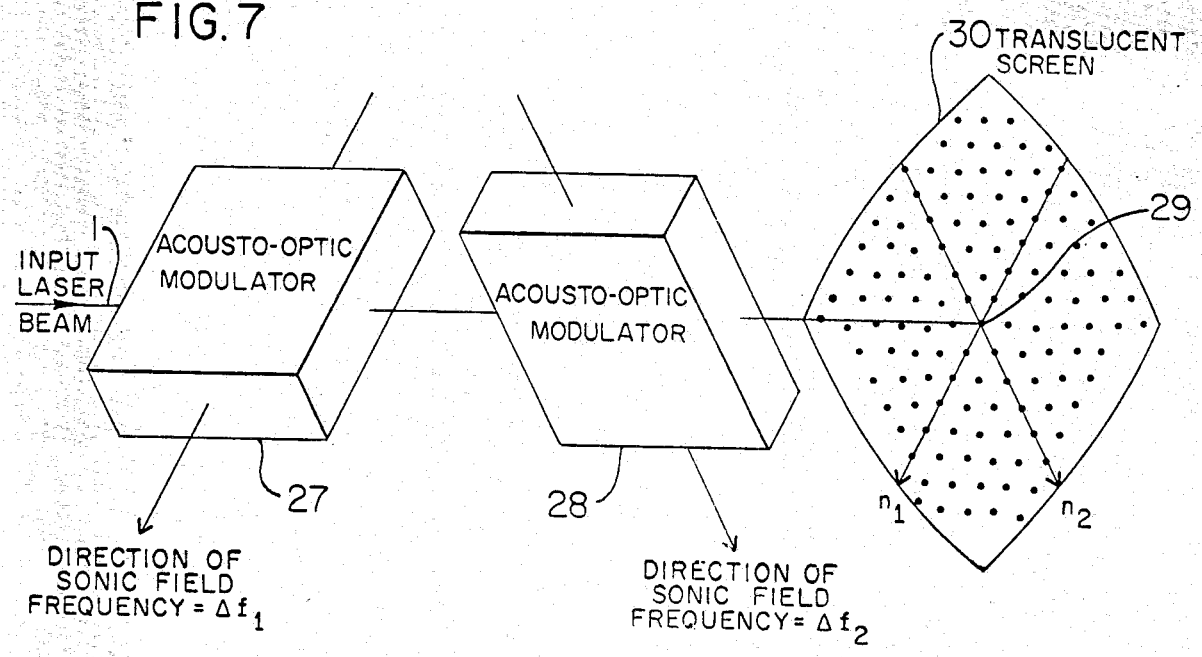
FIG. 7 shows two cascaded acousto-optic modulators with propagating sonic fields oriented along skewed directions.

The embodiment illustrated in FIG. 7 eliminates this problem by rotating the acousto-optic modulators 27 and 28 about the axis of the input laser beam 1 so that the sonic fields are skewed at an angle. The coordinate axes $n_1$ and $n_2$ are defined to intersect at a point 29 on the line formed by the input laser beam 1 as shown in FIG. 7. Further, the $n_1$ axis is made parallel to the sonic field propagation direction of the first acousto-optic modulator 27, and the $n_2$ axis is made parallel to the sonic field propagation of the second modulator 28. In general this configuration can be implemented for any skewed orientation of the two modulators (i.e. for any angle between $n_1$ and $n_2$). The coordinate axes $n_1$ and $n_2$ intersect to form a plane which is perpendicular to the input laser beam. If a translucent screen 30 were placed in this coordinate plane, then the resulting diffracted beams from the two modulators will irradiate the screen and produce an array of lighted dots as shown in FIG. 7. If only the first modulator is excited (sonic field), then the lighted dots would show up only along the $n_1$ axis, and if only the second modulator is excited then the lighted dots will appear only along the $n_2$ axis. The effect of turning on both modulators is to spread the beams outwardly in two directions to form the array as shown in FIG. 7.

Figure 8:
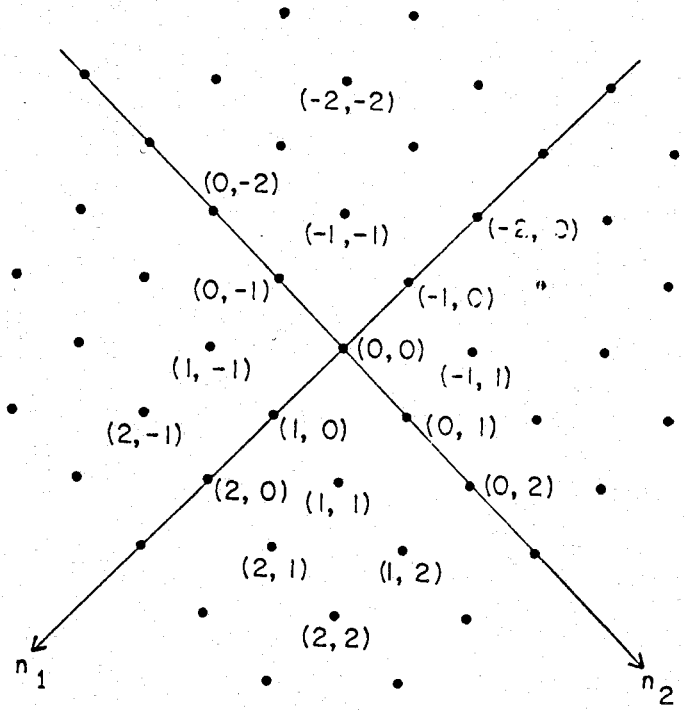
FIG. 8 shows an array of diffracted beams irradiating the translucent screen shown in FIG. 7, the screen being oriented perpendicular to the input beam and parallel to each of two skewed sonic fields.

FIG. 8 shows the special case where the two modulators 27 and 28 are skewed at right angles so that $n_1$ and $n_2$ are orthogonal. The arrows of $n_1$ and $n_2$ are pointing in the same directions as the positive movement of the respective sonic waves. The numbered pairs shown beside the "lighted dots" (diffracted beams) indicate the diffraction order numbers of the first and second modulators, respectively. For example, the "light dot" indicated by the diffraction order pair (2, −1) is created by diffracting the input beam to the positive second order by the first modulator 27 and then diffracting this beam to the negative first order by the second modulator 28. The resulting frequency shift will be an increase of $2\Delta f_1$ by the first modulator 27 plus a decrease of $\Delta f_2$ by the second modulator 28. The output frequency of any beam at the output of this cascade as indicated by the "lighted dots" is given by Equation 4, where $n_1$ and $n_2$ take on the proper signs as shown in FIG. 8. The approximate angle, $\alpha$, between the input laser beam 1 and the given diffracted output beam of the cascade is given by $$\alpha = \sqrt{(n_1\alpha_1)^2 + (n_2\alpha_2)^2} \quad (8)$$

where the n's and $\alpha$'s are defined previously. This assumes that the $n_1$ and $n_2$ axes are perpendicular.

When the output of the skewed cascade, as shown in FIG. 7, is passed through an appropriate lens, then a pattern much like the one shown in FIG. 8 will appear in the lens focal plane. In one transmitter configuration, a two-pinhole spatial filter was placed in the focal plane of a lens so that only the (0, −1) and (−1, 0) beams were allowed to pass through the filter (see FIG. 8). (Many other possible beam pairs can be used.) The first acousto-optic modulator 27 was driven at 40.00 Megahertz and the second 28 at 39.95 Megahertz. This in-line transmitter consisted of a laser, the cascaded modulators (FIG. 7), a lens, and a two pinhole spatial filter.

Using Equation 4, the frequency difference between the two output beams can be shown to be 50 kilohertz. The angle between the beams is 9.3 milliradians (using Equation 8 and the acousto-optical modulator specifications). The pinhole spacing in the lens focal plane is given by Equation 3. Knowing this the fringe separation can be determined using Equation 1. A 60 millimeter focal length lens resulted in a fringe spacing of about 1 millimeter at a distance of one meter from the spatial filter plane.

Because of the small resolutions required, the mechanical stability of the transmitter and the nonuniformity of the fringe pattern are of concern. Thus special care must be taken in the mechanical design of the transmitter and in the simplicity of the optical design. All of the components were mounted securely on a 1.5"×4"×4 ft. long channel beam.

Experimental tests indicated that the nonlinearities and nonuniformities of the moving fringe pattern were less than $3 \times 10^{-5}$ r.m.s. of the total fringe pattern diameter. Using this transmitter and for a one inch fringe pattern diameter, the contour resolution is 30 microinches r.m.s. This is for a measurement time constant of 0.1 seconds, a total laser power over the usable fringe pattern of 6 milliwatts, and a signal-to-noise of about 20 numeric at the image dissector output.

Regardless of the transmitter configuration, three of them can be oriented so that the fringe movement directions form a basis vector set. As shown in FIG. 1, a reference phase signal is taken from each transmitter and sent to the three phase detectors. This reference phase signal can be obtained by deriving it directly from the drive signals that are impressed on the acousto-optic modulators. Another way is to use a separate detector placed directly in the transmitted output beams or to use an optical imaging receiver which images a specific reference point of the specimen onto an optical detector. The phase of the signal (from the image dissector) of each specimen point is compared (referenced) with the phase of these reference signals to measure the three coordinates of the specimen using the three phase detectors (see FIG. 1).

All of the bandpass filters and phase detectors are conventional electronic circuits and are commercially available from many sources. As shown in FIG. 1, the x, y, and z coordinates are measured directly by the three channels. This will occur only if the three transmitter fringe patterns are arranged mutually perpendicular to one another. If fringe pattern can not be so arranged, then the three signals at the phase detector outputs will be the coordinates of a nonorthogonal coordinate system. Under these conditions, the computer can perform a transformation of coordinates to an appropriate rectangular coordinate system.

Still another system configuration is to use only one transmitter, whose fringe movement direction is oriented along the image dissector's optical axis or at an acute angle with respect to the dissector optical axis. The phase measurement of these fringes constitutes one coordinate measurement, and the positional measurements of the dissector scan point constitutes the two other coordinates. These latter two coordinates are in the plane of the image dissector photocathode and are determined directly by the vertical and horizontal deflection voltages (see camera control in FIG. 1) that is supplied from the computer. This is a much simpler configuration, but it is not as accurate as the previously described technique of using three transmitters.

Regardless of the configuration, the computer controls the entire measurement and parts handling process. Preselected scans of the specimen can be accomplished by the computer controlled image dissector. This may allow only critical regions of the specimen to be scanned. The computer commands the dissector to observe a given specimen point, and the three coordinates of this point are measured and stored. This process is repeated for as many points as required. Stored coordinates points can be fitted to a known theoretical equation for a surface. Any resulting surface regions which deviate from specified contour shapes can be highlighted or called out on an overlay of the specimen shown on a video graphics display. Parts can be accepted or rejected on the basis of any quality control criterion stored in the computer. After each part has been measured or inspected, the computer commands the parts handling system to position the next specimen for contour measurement or inspection.

In general, any number of lenses can be used in the design of transmitters as shown in FIGS. 3 and 4 to provide a predetermined point source separation, fringe separation, fringe number, output beam diameter, or other transmitted beam parameter. For example, a relatively large focal length lens can be placed so that its focal plane is in the same plane as the spatial filters. This will provide a collimated output beam where the fringes will be equal distance from each other regardless of the distance from the transmitter. Another example is to use a cylindrical lens as the objective (output) lens. This will result in an oval shaped fringe pattern in which the fringe lines will either be much longer than or much shorter than the transverse distance across the fringe pattern. This application may prove to be useful in certain applications where higher power density is required on certain odd shaped parts.

Figure 9:
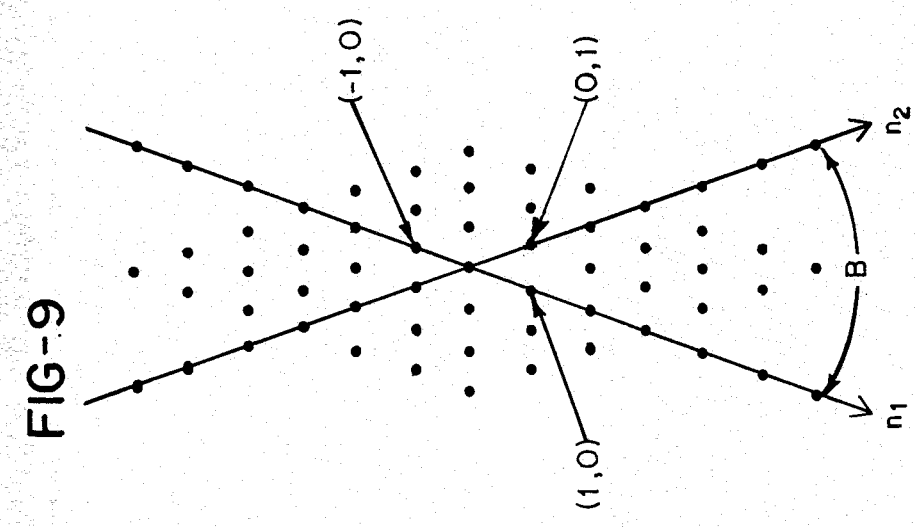
FIG. 9 shows an array of diffracted beams similar to FIG. 8 with the skewed sonic fields oriented at an acute angle.

Another embodiment of an in-line transmitter is to orient the acousto-optic modulators, shown in FIG. 7, so that the directions of the sonic field propagations form a small or acute angle. For this case, the $n_1$ and $n_2$ axes will form a small angle, and the diffraction order numbers of the first and second modulators will be as shown in FIG. 9. This technique allows the modes to be separated while still allowing a much wider variation in the number of fringes across the output beam. Referring to FIG. 9, we can make the angle $\beta$ small enough so that adjacent modes $(-1,0)$ and $(0,1)$ will be far enough apart and only one fringe will be formed across the entire output beam.

Alternatively, we can choose two other modes such as $(1,0)$ and $(0,1)$ which will result in a much larger beam separation angle than in the previous case. In this case, we can have 20 to 30 fringes across the output beam. By combining two such fringe patterns, it is possible to get a low density fringe pattern which will extend across the entire surface to be contoured with an overlay of a very fine fringe pattern. The low density fringe pattern would approximate the location of a coordinate on the surface, whereas the high density fringe pattern will give the precise location of a particular coordinate on the surface of the specimen. This will eliminate the need for fringe counting techniques or the necessity of knowing the location of a reference point on the specimen.

Another application of the invention is for measuring the vibrational amplitude and frequency spectra of a vibrating object such as, for example, an aircraft structure. If a given coordinate on an object can be precisely located in space using the moving fringe concept, then its motion in time can also be measured. As described above, the contour coordinate of an object point is determined by measuring the D.C. value of the phase. If the object point is moving or vibrating, then its interaction with the moving fringes acts like a carrier frequency which is phase modulated. Because this is a non-contacting technique where the use of high fringe frequencies are possible, both vibrational amplitudes and frequencies can be accurately measured over a wide frequency range.

Figure 10:
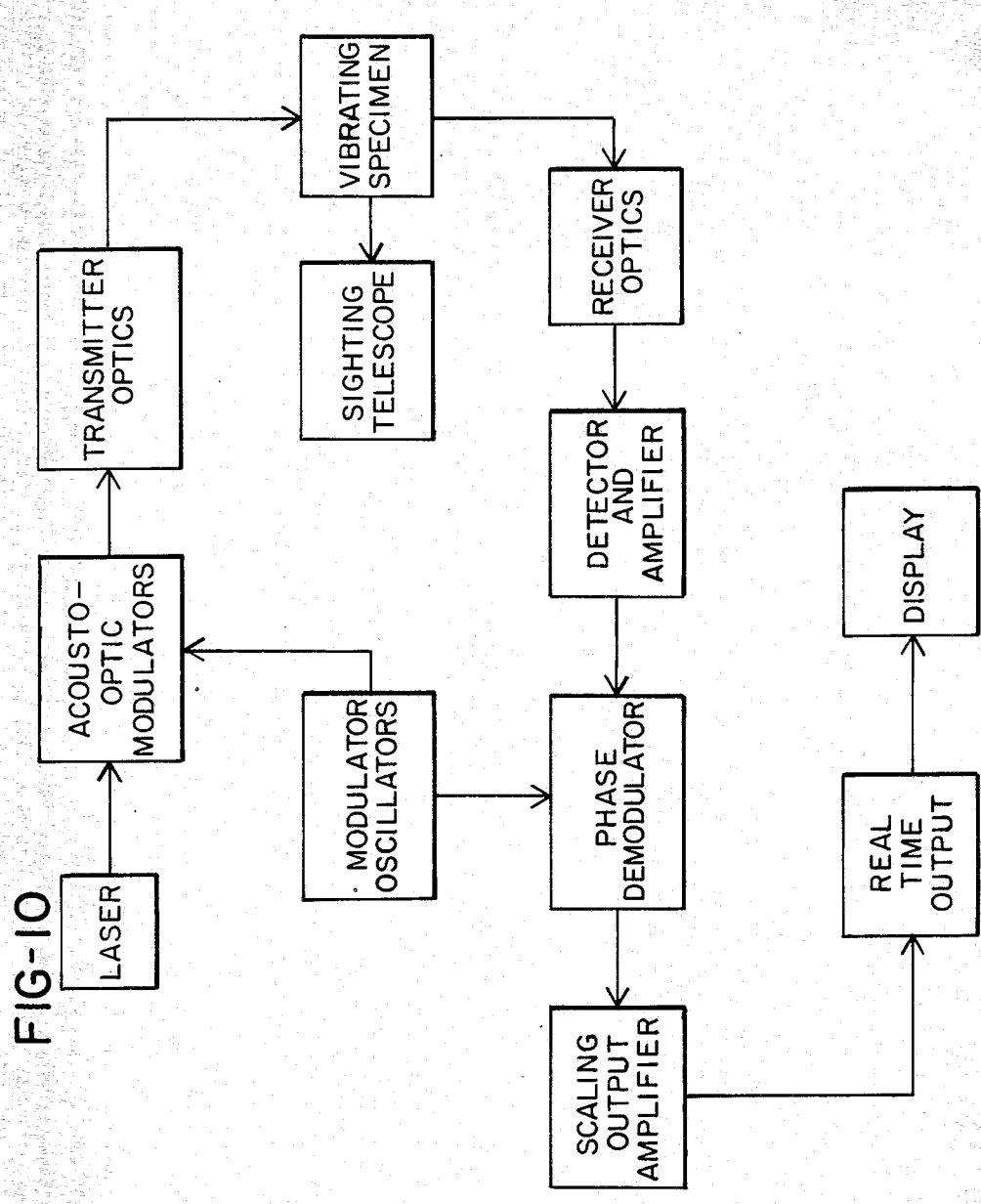
FIG. 10 is a block diagram of a vibration measurement system constructed in accordance with the invention.

One embodiment of a vibrational measurement system is shown in FIG. 10. The laser, acousto-optic modulators, and transmitter optics represents any of the transmitter configurations described above. In general, the transmitter is designed so as to have a minimal number of fringes across the beam (one or two) so that the total phase variation of the vibrating object would be less than $2\pi$ radians. As shown in FIG. 10, a sighting telescope can be used to direct the transmitted beam onto a particular point on the vibrating specimen. The reflected radiation from the vibrating specimen is picked up by a receiver which may be a simple lens followed by a detector and amplifier. The detector may be a single silicon photo diode, or other form of optical detector, or an array of detectors. The amplifier output will be a signal which oscillates at the transmitted fringe frequency and which has a phase modulated by the vibrational information. The phase demodulator will remove this vibrational information from the carrier where it then can be amplified and displayed in a suitable manner. For example, the output can be passed through a spectrum analyzer which would give a plot of amplitude as a function of frequency.

While the forms of apparatus and method herein described constitute preferred embodiments of the invention, it is to be understood that the invention is not limited to these precise forms of apparatus and method steps, and that changes may be made therein without departing from the scope and spirit of the invention as defined in the appended claims.

The invention having thus been described, the following is claimed:

1. Apparatus for determining the position of a light reflecting surface with respect to time, comprising a laser for projecting a beam, means for diffracting the laser beam into a plurality of light beams forming a small angle therebetween and transmitted at predetermined optical frequencies, lens means for focusing the diffracted beams down to small points, means for blocking a portion of the diffracted beams, means for projecting the beams onto the light reflecting surface to produce at least one fringe pattern on the surface with the pattern moving in a predetermined direction and at a predetermined frequency, receiver means for observing at least one selected point on the surface from a direction forming a substantial angle with the bisector of the small angle and for producing on oscillatory signal corresponding to a fringe pattern component reflected by the surface point, means for determining the phase of the signal corresponding to the selected point with respect to a reference signal, and means responsive to the phase of the signal for the selected point on the surface for determining a location of the selected point as a function of time.

2. Apparatus as defined in claim 1 and including means for controlling said receiver means to produce a predetermined scan by said receiver means.

3. Apparatus as defined in claim 2 wherein said controlling means is responsive to predetermined information relating to the light reflecting surface.

4. Apparatus as defined in claim 2 wherein said controlling means is responsive to phase information corresponding to previously measured selected points on the light reflecting surface.

5. Apparatus as defined in claim 1 and including a computer system for transforming phase information for each point on the light reflecting surface into corresponding surface coordinates.

6. Apparatus as defined in claim 5 wherein said computer system transforms the coordinates for each point on the surface into coordinates of another coordinate system.

7. Apparatus as defined in claim 5 wherein said computer system includes means for comparing the computed coordinates with a set of coordinates corresponding to a master surface.

8. Apparatus as defined in claim 1, and including means for visually displaying information corresponding to the position of the light reflecting surface as a function of time.

9. Apparatus as defined in claim 1 wherein said means for expanding a plurality of the separate beams into expanded beams, for recombining the expanded beams at predetermined relative angles and for projecting the recombined beams onto the light reflecting surface comprise an optical lens system.

10. Apparatus as defined in claim 9 wherein said optical lens system includes lens means for focusing a plurality of the diffracted beams down to small points, and means for blocking a portion of the diffracted beams.

11. Apparatus as defined in claim 10 wherein said blocking means comprises a thin opaque material containing a plurality of small holes of predetermined size separated by predetermined distances, and means for precisely positioning the holes.

12. Apparatus as defined in claim 1 wherein said means for diffracting the laser beam comprise an acousto-optic modulator.

13. Apparatus as defined in claim 1 wherein said blocking means comprise a thin opaque material containing a plurality of small holes of predetermined size separated by predetermined distances, and means for precisely positioning the holes.

14. Apparatus as defined in claim 1 wherein said receiver means comprise an image dissector televison camera.

15. Apparatus as defined in claim 1 wherein said means for blocking a portion of the diffracted beams provides for combining a plurality of fringe patterns.

16. Apparatus for determining the position of a light reflecting surface with respect to time, comprising a laser for projecting a beam, means for splitting the laser beam into a plurality of separate beams forming a small angle therebetween, means including a plurality of cascaded acousto-optic modulators for creating an optical frequency difference between the separate beams by shifting the optical frequency of at least one of the separate beams, means for recombining the separate beams into overlapping beams at predetermined relative angles and for projecting the overlapping beams onto the light reflecting surface to produce at least one fringe pattern on the surface with the pattern moving in a predetermined direction and at a predetermined frequency, receiver means for observing at least one selected point on the surface from a direction forming a substantial angle with the bisector of the small angle and for producng an oscillatory signal corresponding to a fringe pattern component reflected by the surface point, means for determining the phase of the signal corresponding to the selected point with respect to a reference signal, and means responsive to the phase of the signal for the selected point on the surface for determining a location of the selected point as a function of time.

17. Apparatus as defined in claim 16 wherein said plurality of cascaded acousto-optic modulators include at least two cascaded acousto-optic modulators oriented such that their impressed sonic fields are parallel and in the same propagating direction.

18. Apparatus as defined in claim 16 wherein said plurality of cascaded acousto-optic modulators include at least two cascaded acousto-optic modulators oriented such that their impressed sonic fields are parallel and in opposite propagating directions.

19. Apparatus as defined in claim 16 wherein said plurality of cascaded acousto-optic modulators include at least two cascaded acousto-optic modulators oriented such that their impressed sonic fields are propagating along skewed directions.

20. Apparatus as defined in claim 16 wherein said plurality of cascaded acousto-optic modulators includes at least two cascaded acousto-optic modulators oriented such that their impressed sonic fields are parallel and in the same direction.

21. Apparatus as defined in claim 16 wherein said plurality of cascaded acousto-optic modulators include at least two cascaded acousto-optic modulators oriented such that their impressed sonic fields are parallel and in opposite propagating directions.

22. Apparatus as defined in claim 16 wherein said plurality of cascaded acousto-optic modulators include at least two cascaded acousto-optic modulators oriented such that their impressed sonic fields are propagating along skewed directions.

23. Apparatus for determining the position of a light reflecting surface with respect to time, comprising a laser for projecting a beam, means including a plurility of cascaded acousto-optic modulators for diffracting the laser beam into a plurality of light beams forming a small angle therebetween and transmitted at predetermined optical frequencies, means for expanding a plurality of the separate beams into expanded beams, for recombining the expanded beams at predetermined relative angles and for projecting the recombined beams onto the light reflecting surface to produce at least one fringe pattern on the surface with the pattern moving in a predetemined direction and at a predetermined frequency, receiver means for observing at least one selected point on the surface from a direction forming a substantial angle with the bisector of the small angle and for producing an oscillatory signal corresponding to a fringe pattern component reflected by the surface point, means for determining the phase of a signal corresponding to the selected point with respect to a reference signal, and means responsive to the phase of the signal for the selected point on the surface for determining a location of the selected point as a function of time.

24. Apparatus for determining the position of a light reflecting surface with respect to time, comprising light transmitter means for producing two light beams forming a small angle therebetween, means receiving the light beams and for projecting a plurality of fringe patterns onto the surface with the patterns moving in predetermined non-coplanar directions and at predetermined frequencies, receiver means for observing at least one selected point on the surface from a direction forming a substantial angle with the bisector of the small angle and for producing an oscillatory signal corresponding to a fringe pattern component reflected by the surface point, means for determining the phase of the signal corresponding to the selected point with respect to a reference signal, and means responsive to the phase of the signal for the selected point on the surface for determining a location of the selected point as a function of time.

* * * * *